US012644850B2

(12) United States Patent
Woo et al.

(10) Patent No.: US 12,644,850 B2
(45) Date of Patent: Jun. 2, 2026

(54) DEFORMATION ANALYSIS DEVICE FOR SECONDARY BATTERY AND METHOD THEREOF

(71) Applicants: SAMSUNG SDI CO., LTD., Yongin-si (KR); UNIST (Ulsan National Institute of Science and Technology), Ulsan (KR)

(72) Inventors: Seong Ho Woo, Yongin-si (KR); Dae Sik Kim, Yongin-si (KR); Sung Kook Lee, Yongin-si (KR); Ji Young Kim, Yongin-si (KR); Bo Ram Lee, Yongin-si (KR); Hyun-Wook Lee, Ulsan (KR); Changhyun Park, Ulsan (KR); Ukhyun Jung, Ulsan (KR)

(73) Assignees: SAMSUNG SDI CO., LTD., Yongin-si (KR); UNIST (Ulsan National Institute of Science and Technology), Ulsan (KR)

(*) Notice: Subject to any disclaimer, the term of this patent is extended or adjusted under 35 U.S.C. 154(b) by 186 days.

(21) Appl. No.: 18/590,229

(22) Filed: Feb. 28, 2024

(65) Prior Publication Data

US 2024/0385127 A1 Nov. 21, 2024

(30) Foreign Application Priority Data

May 15, 2023 (KR) ........................ 10-2023-0062216

(51) Int. Cl.
*G06T 7/62* (2017.01)
*G01N 23/046* (2018.01)
(Continued)

(52) U.S. Cl.
CPC ......... *G01N 23/046* (2013.01); *G06T 7/0004* (2013.01); *G06T 7/97* (2017.01);
(Continued)

(58) Field of Classification Search
CPC ........... G01N 23/046; G01N 2223/304; G01N 2223/419; G01N 2223/401; G06T 7/0004;
(Continued)

(56) References Cited

FOREIGN PATENT DOCUMENTS

| | | | |
|---|---|---|---|
| KR | 10-2385728 B1 | 4/2022 | |
| KR | 10-2022-0111363 A | 8/2022 | |
| KR | 20220111363 A | * 8/2022 | ........... G06T 11/003 |

OTHER PUBLICATIONS

Matt et al. "Virtual unrolling of spirally-wound lithium-ion cells for correlative degradation studies and predictive fault detection", The journal Society of Chemistry, Sustainable Energy Fuels, 2019 p. 2972-2976. (Year: 2019).*

(Continued)

*Primary Examiner* — Uzma Alam
*Assistant Examiner* — Mamadou Faye
(74) *Attorney, Agent, or Firm* — Lee IP Law, P.C.

(57) ABSTRACT

A deformation analysis device for a secondary battery and a non-destructive analysis method by which electrode deformation of a secondary battery may be diagnosed using a computed tomography (CT) image, the method including the steps of obtaining an image by performing computed tomography (CT) on the secondary battery, generating an intensity graph using brightness differences from the image, measuring a core peak FWHM (full width at half maximum) or a core diameter change value from the intensity graph, and determining that the electrode assembly is deformed if the measured core peak FWHM is greater than a peak reference value or the core diameter change value is greater than a diameter reference value.

20 Claims, 8 Drawing Sheets

(51) Int. Cl.
 G06T 7/00 (2017.01)
 H01M 10/04 (2006.01)

(52) U.S. Cl.
 CPC .. H01M 10/0422 (2013.01); *G01N 2223/304*
  (2013.01); *G01N 2223/419* (2013.01); *G06T*
   *2207/10081* (2013.01); *G06T 2207/20224*
                            (2013.01)

(58) Field of Classification Search
 CPC ............ G06T 7/97; G06T 2207/10081; G06T
                2207/20224; G06T 7/62; G06T
              2207/30108; H01M 10/0422; H01M
              10/0431; H01M 10/4285; H01M 10/48;
              Y02E 60/10; Y02P 70/50; G01B 15/06
 See application file for complete search history.

(56) References Cited

OTHER PUBLICATIONS

Translation of KR-20220111363-A (Year: 2022).*
Pfrang, et al. Deformation from Formation Until End of Life: Micro
X-ray, etc. Journal of the Electrochemical Society, 2023 170030548,
vol. 170, No. 3, Published: Apr. 4, 2023.p. 30548.
Kok et al. Virtual Unrolling of Sprially-wound Lithium-Ion Cells
for Correlative, etc. Sustainable Energy & Fuels, vol. 3, No. 11,
Aug. 19, 2019, pp. 2972-2976.
European Search Report dated Nov. 8, 2024.

* cited by examiner

DEFORMATION ANALYSIS DEVICE FOR SECONDARY BATTERY AND METHOD THEREOF

CROSS-REFERENCE TO RELATED APPLICATION

Korean Patent Application No. 10-2023-0062216 filed on May 15, 2023, in the Korean Intellectual Property Office, is incorporated herein by reference in its entirety.

BACKGROUND

1. Field

A deformation analysis device for a secondary battery and a method thereof is disclosed.

2. Description of the Related Art

Due to continuous charging and discharging of secondary batteries, various electrochemical reactions occur inside a battery that result in battery deterioration and performance deterioration. In particular, internal deformation of a battery, which occurs during charging and discharging, is a major factor causing deterioration and performance degradation. In order to analyze this deterioration phenomena, a destructive analysis method that involves disassembling a battery to proceed with the analysis has been used. However, this analysis method inevitably causes damage to the inside of the battery during the disassembly process and makes it difficult to determine the actual cause of performance deterioration and therefore is limited in confirming the tendency of deterioration as charging and discharging progresses.

SUMMARY

Embodiments are directed to a deformation analysis method for a secondary battery having an electrode assembly in a case. The deformation analysis method may comprise the steps of obtaining an image by performing computed tomography (CT) imaging on the secondary battery, generating an intensity graph using brightness differences from the image, measuring a core peak FWHM (full width at half maximum) or a core diameter change value from the intensity graph, and determining that the electrode assembly is deformed if the measured core peak FWHM is greater than a peak reference value or the core diameter change value is greater than a diameter reference value.

In an implementation, the secondary battery may have a cylindrical shape.

In an implementation, the electrode assembly may include a stack of a positive electrode plate, a separator, and a negative electrode plate wound into a cylindrical shape.

In an implementation, the intensity graph may be generated from a difference in brightness between the core and a core periphery of the electrode assembly.

In an implementation, the core may be an empty space, the periphery of the core may be a winding leading end region of the electrode assembly, and the core may be darker than the winding leading end region in brightness.

In an implementation, the image may be obtained by photographing perpendicular to a winding axis of the electrode assembly.

In an implementation, the method steps may be repeatedly performed depending on a number of charge/discharge cycles of the secondary battery.

In embodiments, the deformation analysis method may further include the step of converting a change in the core peak FWHM according to the number of charge/discharge cycles into a peak FWHM graph or converting a change in the core diameter according to the number of charge/discharge cycles into a diameter change graph.

In an implementation, the peak reference value may be 0.2 mm to 0.6 mm.

In an implementation, the diameter reference value may be 0.5 mm to 2 mm.

Embodiments are also directed to a deformation analysis device for a secondary battery having an electrode assembly in a case. The deformation analysis device may have a control circuit, a processor installed in the control circuit, and a memory installed in the control circuit and operably connected to the processor, wherein the processor may execute a program code stored in the memory that may be configured to perform the operations of obtaining an image by performing CT (computed tomography) scanning of the secondary battery, generating an intensity graph using brightness differences from the image, measuring a core peak FWHM (full width at half maximum) or a core diameter change value from the intensity graph, and determining that the electrode assembly is deformed if the measured core peak FWHM is greater than a peak reference value or the core diameter change value is greater than a diameter reference value.

In an implementation of the deformation analysis device, the secondary battery may have a cylindrical shape.

In an implementation of the deformation analysis device, the electrode assembly may include a stack of a positive electrode plate, a separator, and a negative electrode plate wound into a cylindrical shape.

In an implementation of the deformation analysis device, the intensity graph may be generated from a difference in brightness between the core and a core periphery of the electrode assembly.

In an implementation of the deformation analysis device, the core may be an empty space, the periphery of the core may be a winding leading end region of the electrode assembly, and the core may be darker than the winding leading end region in brightness.

In an implementation of the deformation analysis device, the image may be obtained by photographing perpendicular to a winding axis of the electrode assembly.

In an implementation of the deformation analysis device, the operations may be repeatedly performed depending on a number of charge/discharge cycles of the secondary battery.

In an implementation of the deformation analysis device, the apparatus may be configured to further perform an operation of converting a change in the core peak FWHM according to the number of charge/discharge cycles into a peak FWHM graph or converting a change in the core diameter according to the number of charge/discharge cycles into a diameter change graph.

In an implementation of the deformation analysis device, the peak reference value may be 0.2 mm to 0.6 mm.

In an implementation of the deformation analysis device, the diameter reference value may be 0.5 mm to 2 mm.

The present disclosure provides a deformation analysis device for a secondary battery and a method thereof, by which electrode deformation of a secondary battery can be diagnosed by using a computed tomography (CT) image that is a non-destructive analysis method.

BRIEF DESCRIPTION OF DRAWINGS

Features will become apparent to those of skill in the art by describing in detail exemplary embodiments with reference to the attached drawings, in which.

DETAILED DESCRIPTION

Figure 1:
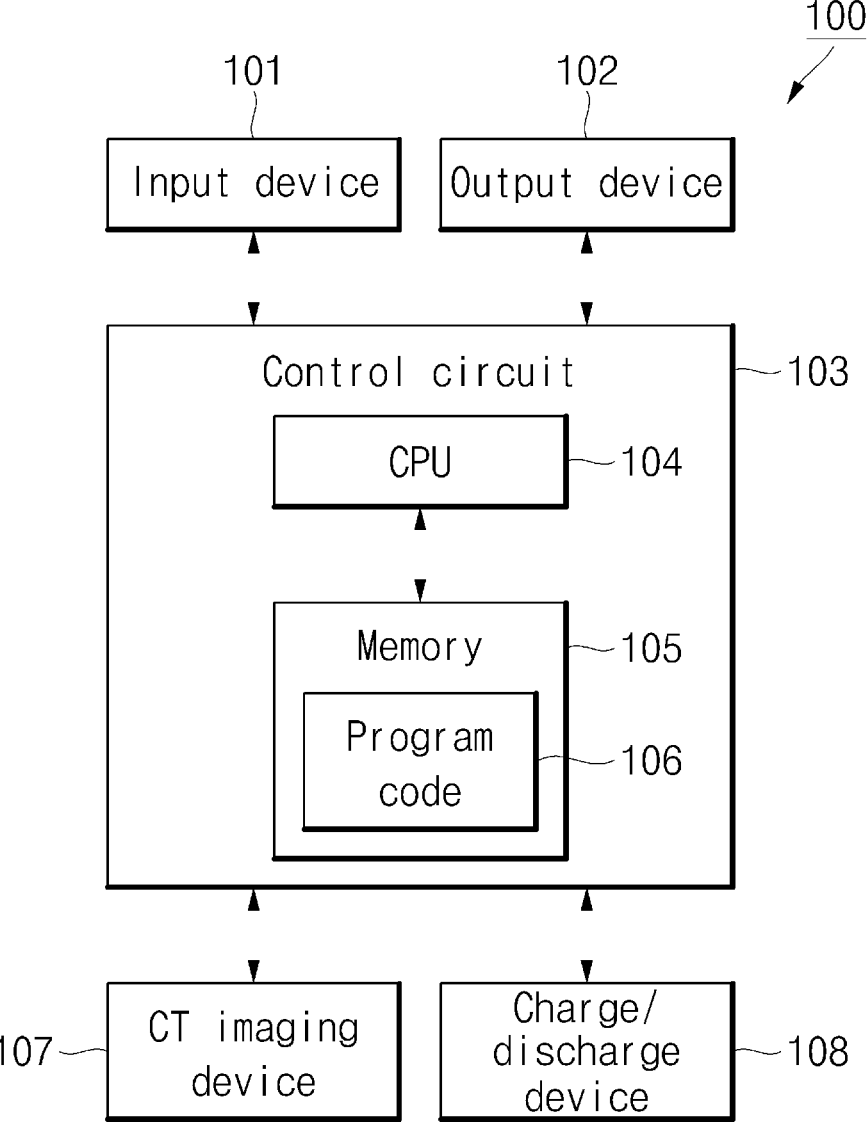
FIG. 1 is a block diagram showing the configuration of an exemplary deformation analysis device for a secondary battery, according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In addition, in the accompanying drawings, like numbers refer to like elements throughout. As used herein, the term "and/or" includes any and all combinations of one or more of the associated listed items. The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," if used in this specification, specify the presence of stated features, numbers, steps, operations, elements, and/or components, but do not preclude the presence or addition of one or more other features, numbers, steps, operations, elements, components, and/or groups thereof.

In addition, the control circuit and/or any other relevant devices or components according to embodiments of the present disclosure may be implemented utilizing any suitable hardware, firmware (e.g. an application-specific integrated circuit), software, or a suitable combination of software, firmware, and hardware. For example, the various components of the devices described herein may be formed on one integrated circuit (IC) chip or on separate IC chips. Further, the various components of the control circuit and/or other devices may be implemented on a flexible printed circuit film, a tape carrier package, a printed circuit board, or formed on a same substrate as the control circuit and/or other devices. Further, the various components of the control circuit and/or other devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory. The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

FIG. 1 is a block diagram showing the configuration of an exemplary deformation analysis device 100 for a secondary battery, according to an embodiment of the present disclosure. As shown in FIG. 1, an exemplary deformation analysis device 100 for a secondary battery, according to an embodiment of the present disclosure, may include an input device 101, an output device 102, a control circuit 103, and a central processing unit (CPU) 104, a memory 105, and a program code 106. In some examples, the exemplary deformation analysis device 100 of a secondary battery according to an embodiment of the present disclosure may further include a CT imaging device 107 and/or a charge/discharge device 108.

The control circuit 103 may execute the program code 106 stored in the memory 105 through the CPU 104 and control the overall operation of the deformation analysis device 100 accordingly. In some examples, the program code 106 may include an image analysis tool such as "Image J," which can be downloaded for free at, e.g., imagej.net.

The deformation analysis device 100 may receive data or information entered by a user through the input device 101, such as a keyboard or a mouse, and may output images or sounds through the output device 102, such as a monitor or a speaker. In some examples, the deformation analysis device 100 may receive a CT image directly or indirectly from the CT imaging device 107. In some examples, the deformation analysis device 100 may receive the number of charge/discharge cycles directly or indirectly from the charge/discharge device 108. In some examples, the deformation analysis device 100 may receive data paired with the CT image and the number of charge/discharge cycles.

The memory 105 may store various set values (e.g., a peak reference value or a diameter reference value) for implementation of the present disclosure, received CT images, received number of charge and discharge cycles, and a program code 106 for controlling the operation of the deformation analysis device 100.

The CT imaging device 107 may obtain a CT image by performing CT imaging of the secondary battery and directly or indirectly transmit the obtained CT image to the deformation analysis device 100.

In some examples, the CT imaging device 107 may be controlled by direct control by the control circuit 103, and thus, the control circuit 103 may obtain or receive a CT image directly from the CT imaging device 107. In some examples, the CT image obtained from the CT imaging device 107 may be provided to the control circuit 103 indirectly through the input device 101.

The charge/discharge device 108 may provide current and voltage to the secondary battery that is to be CT imaging to charge the secondary battery, or connect a load to the secondary battery to discharge the secondary battery.

In some examples, the charge/discharge device 108 may be directly controlled by the control circuit 103, and thus, the control circuit 103 may obtain or receive the number of charge/discharge cycles directly from the charge/discharge device 108. In some examples, the number of charge/discharge cycles obtained from the charge/discharge device 108 may be provided indirectly to the control circuit 103 through the input device 101.

In some examples, CT images for each number of charge/discharge cycles of the secondary battery may be provided to the control circuit 103 in the form of mutually matched data. In other words, whenever a charge/discharge cycle of the secondary battery elapses, CT imaging is performed on the secondary battery, and thus data including the number of charge/discharge cycles and CT images may be directly or indirectly transmitted to the control circuit 103.

Figure 2:
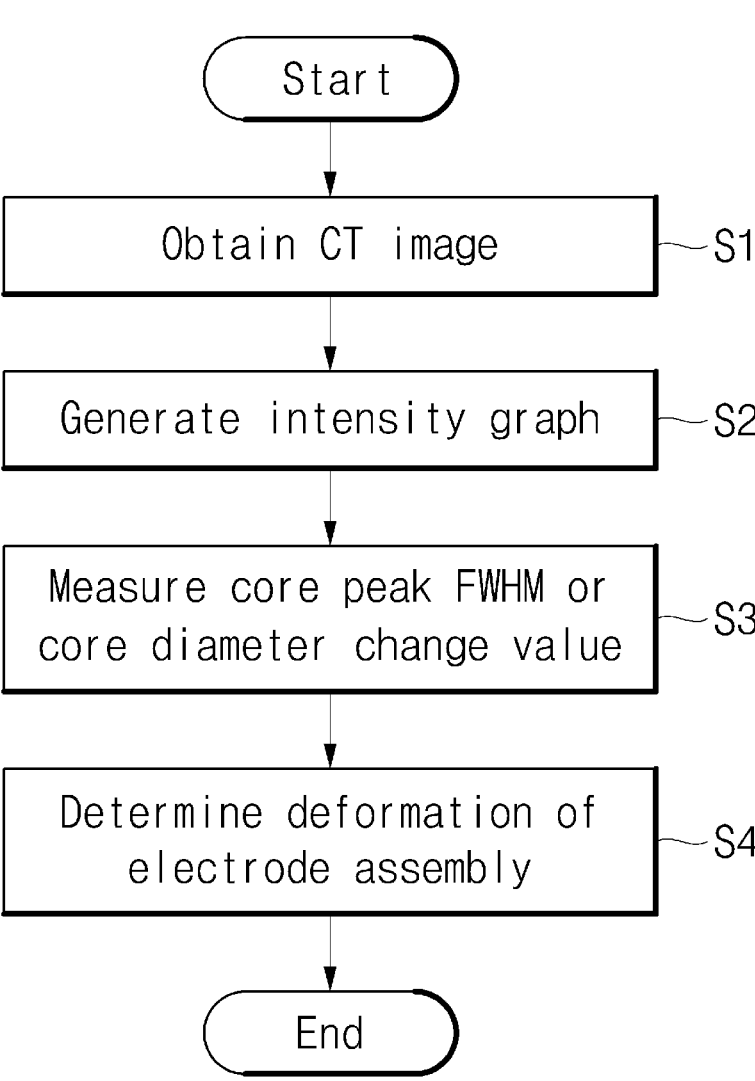
FIG. 2 is a flowchart illustrating a method for analyzing deformation for an exemplary secondary battery, according to an embodiment of the present disclosure.

FIG. 2 is a flowchart illustrating a method for analyzing deformation of an exemplary secondary battery, according to an embodiment of the present disclosure. As shown in FIG. 2, the exemplary method for analyzing deformation of a secondary battery, according to an embodiment of the present disclosure, may include: a first step (S1) of obtaining a CT image by performing CT imaging on the secondary battery; a second step (S2) of generating an intensity graph from the CT image; a third step (S3) of measuring a core peak FWHM (full width at half maximum) or a core diameter change value from the intensity graph; measuring the core peak FWHM and/or core diameter change value from the infinity graph; and a fourth step (S4) of determining that the electrode assembly is deformed if the measured core peak FWHM is greater than a peak reference value or the core diameter change value is greater than a diameter reference value.

In the first step (S1), the control circuit 103 may obtain or receive a CT image from the CT imaging device 107. In some examples, the secondary battery may be CT imaged by the CT imaging device 107, and a corresponding CT image may be transmitted from the CT imaging device 107 to the control circuit 103. As described above, the CT imaging device 107 may operate in response to a control signal from the control circuit 103, or may operate independently to transmit the CT image to the control circuit 103 directly or indirectly.

In the second step (S2), the control circuit 103 may generate an intensity graph by using the brightness difference from the CT image. The control circuit 103 may generate an intensity graph by using the difference in brightness or shade between the core of the electrode assembly and the core periphery. In some examples, the intensity graph may be generated with normalized distance or length displayed on the X-axis and intensity displayed on the Y-axis.

In the third step (S3), the control circuit 103 may measure the core peak full width at half maximum (FWHM) and/or core diameter change value from the intensity graph.

In general, the core may be an empty space, the periphery of the core may be a winding leading end region of the electrode assembly, and, in the CT image, the core may be darker than the winding leading end region in brightness. For example, in the CT image, the core may be displayed to be dark and the periphery of the core is displayed to be bright. Therefore, on the intensity graph, the intensity of the core is displayed to be relatively low and the intensity of the periphery of the core is displayed to be relatively high. Accordingly, the control circuit 103 may measure the core peak FWHM and/or the core diameter using an image analysis tool, and may also measure the amount of change in core diameter as the number of charge/discharge cycles elapses.

In the fourth step (S4), the control circuit 103 may determine that the electrode assembly is deformed if the measured core peak FWHM is greater than a preset peak reference value and/or if the core diameter change value is greater than a preset diameter reference value. In some examples, the control circuit 103 may output, through the output device 102, one intensity graph, multiple intensity graphs according to the number of charge/discharge cycles, the core peak FWHM and/or the core diameter according to the number of charge/discharge cycles, a peak reference value, a core diameter change value, and whether or not there is deformation.

Hereinafter, the deformation analysis method of the secondary battery according to the present disclosure will be described in more detail.

[Preparation of Secondary Battery]

First, a cylindrical secondary battery containing a jelly-roll shaped electrode assembly may be prepared in a cylindrical case (or cylindrical can).

Figure 3A:
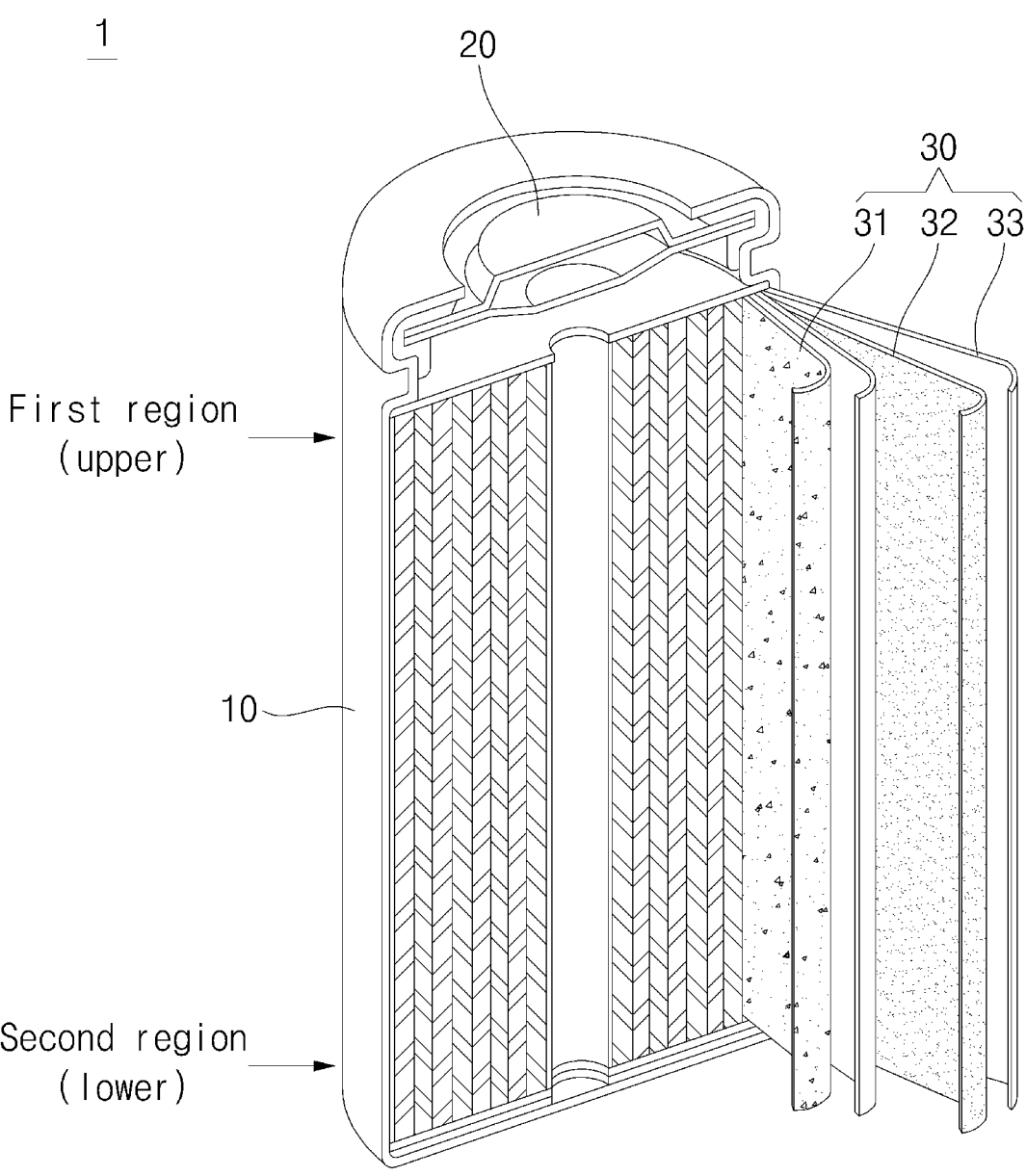
FIGS. 3A and 3B are longitudinal and cross-sectional views of an exemplary secondary battery.
Figure 3B:
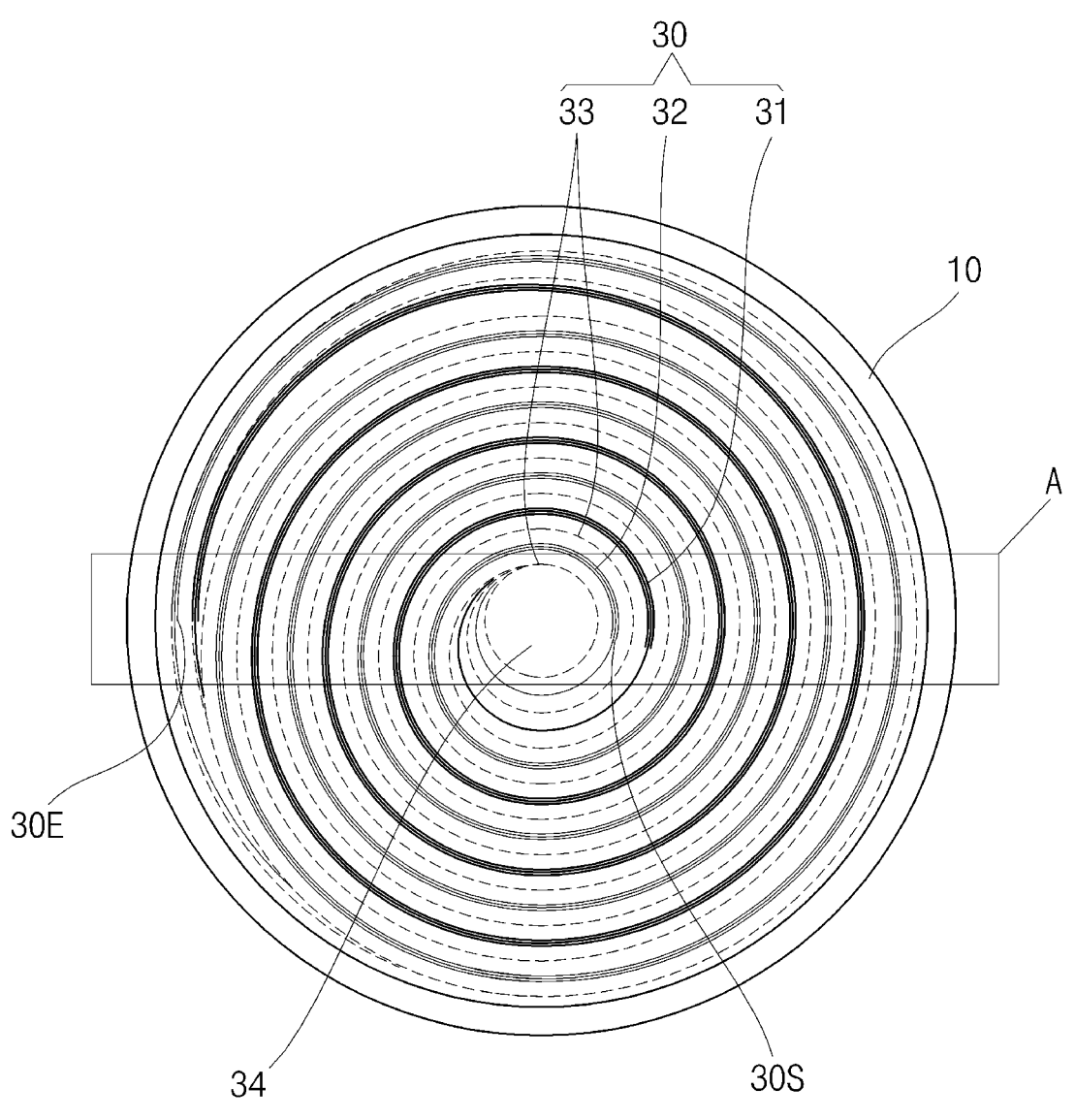

FIGS. 3A and 3B are longitudinal and cross-sectional views of an exemplary secondary battery. Here, FIG. 3B is significantly exaggerated to illustrate the wound state of the electrode assembly. In practice, the center of the electrode assembly has an empty space (or core) that is approximately circular, and there is almost no empty space between the outside of the electrode assembly and the inner surface of the case (or can). In practice, the electrode assembly may be wound to approximate a perfect circle, and FIG. 3B is exaggerated to illustrate the winding structure as described above. Additionally, a person skilled in the art will understand that the CT image corresponding to FIG. 3B is the opposite of the shading in FIG. 3B.

In some examples, the secondary battery 1 may be manufactured such that, after the jelly-roll shaped electrode assembly 30 is accommodated in the cylindrical can 10 and an electrolyte is injected to immerse the electrode assembly 30 in the cylindrical can 10 (optional), the cap assembly 20 is coupled to the opened upper end of the cylindrical can 10. In some examples, the electrode assembly 30 may be in the form of a jelly-roll manufactured by stacking a positive electrode 31 and a negative electrode 32 with a separator 33 interposed therebetween and then winding the electrode assembly 30 in one direction. In FIG. 3B, 30S refers to a winding leading end region of the electrode assembly 30 where winding begins, and 30E refers to the winding end region of the electrode assembly 30 where winding ends. Since information regarding the anode, cathode, separator, and electrolyte are known to a person skilled in the art, detailed description will be omitted.

In some examples, the cylindrical can 10 may be made of metal, such as steel or stainless steel. In some examples, the cylindrical can may include a receiving portion in which the electrode assembly can be accommodated, and may have an open top portion. In some examples, a beading part that is bent to enable sealing after the cap assembly 20 is coupled may be provided at the open top portion of the cylindrical can 10, and, in order to fix the cap assembly (20), the cap assembly may include an upper portion bent to provide a crimping part. In some examples, the beading part may be provided at a portion where the cap assembly contacts the cylindrical can and may be indented toward the inside of the cylindrical can. In some examples, the cylindrical can may serve as a negative electrode terminal for connection to an external circuit. In some examples, the cap assembly 20 may be configured such that a cap-up and a safety vent are in close contact with an airtight gasket installed in a space formed on the upper inner surface of the crimping part and the beading part of the cylindrical can 10. A central portion of the cap-up protrudes upward and thus may serve as a positive electrode terminal for connection to an external circuit. In some examples, a core 34 in the form of a hollow space may be provided at the center of the electrode assembly 30 wound in a jelly-roll shape. In some examples, a center pin (not shown), which is a cylindrical metal material, may be inserted into the core 34 to provide a certain strength to the electrode assembly, and in some cases, the electrode may be welded to a cylindrical can or cap assembly. In some examples, a negative tab may protrude from the bottom surface of the electrode assembly and welded to the bottom surface of the cylindrical can, and a positive tab may protrude from the top end of the electrode assembly and welded to the cap assembly.

The cylindrical secondary battery 1 described herein is provided only by way of example for understanding the present disclosure, and the present disclosure is not limited to the present cylindrical secondary battery 1. As an example, the present disclosure may also be applied to a 18650 (18 mm in diameter and 65 mm in height) cylindrical battery, a 21700 (21 mm in diameter and 70 mm in height) cylindrical battery, or a 4680 (46 mm in diameter and 80 mm in height) cylindrical batter, and may also be applied to cylindrical batteries to be manufactured in the future.

In some examples, the CT imaging region of the secondary battery 1 may include a first region adjacent to the cap assembly, a second region adjacent to the bottom surface of the can, and a third region adjacent to the middle of the can. In other words, the first region may be approximately the upper region of the electrode assembly, the second region may be approximately the lower region of the electrode assembly, and the third region may be approximately the middle region of the electrode assembly. In some examples, if one secondary battery is selected, and the first region is subjected to CT imaging, it is desirable to perform CT imaging on the same first region even after subsequent charge and discharge cycles. In addition, if one secondary battery is selected, and the second region is subjected to CT imaging, it is desirable to perform CT imaging on the same second region even after subsequent charge and discharge cycles. In addition, if one secondary battery is selected, and the third region is subjected to CT imaging, it is desirable to perform CT imaging on the same third region even after subsequent charge and discharge cycles.

[CT Imaging]

If the cylindrical secondary battery is prepared in the above-described manner, an image of a cross section perpendicular to the winding axis of the electrode assembly may be obtained by a CT imaging device. As described above, the image is obtained by imaging the first region of the secondary battery (e.g., the upper region of the electrode assembly), or the image is obtained by imaging the second region of the secondary battery (e.g., the lower region of the electrode assembly) or the third region of the secondary battery (e.g., the middle region of the electrode assembly). In some examples, the CT images may be obtained from the first region (upper region), the second region (lower region), and/or the third region (middle region) perpendicular to the winding axis.

In some examples, the thus obtained images may be obtained after the secondary battery is charged and discharged through a charge/discharge device. If the secondary battery is charged and discharged once, this case may be defined that one cycle of the secondary battery has elapsed. In some examples, a CT image may be obtained from a CT imaging device whenever approximately 1 to 100 cycles of the secondary battery elapse by the charge/discharge device.

In some examples, the CT imaging device 107 may include a jig on which a secondary battery is mounted, an X-ray irradiator that irradiates X-rays to the secondary battery, an X-ray detector that detects the X-rays having passed through the secondary battery, and a computer capable of obtaining a CT image of the secondary battery from the X-rays having passed through the secondary battery and then storing the image. Finally, the CT image obtained from the CT imaging device may be transmitted directly or indirectly to the control circuit 103 of the deformation analysis device 100 of the secondary battery.

In some examples, the charge/discharge device 108 may include a jig on which a secondary battery is mounted, a charge circuit connected to the secondary battery to provide charging power, a discharge circuit connected to the secondary battery and operating as a load, a positive electrode pin and a negative electrode pin that connect the charge circuit/discharge circuit to the positive electrode terminal and the negative electrode terminal of the secondary battery, respectively, and a computer capable of storing charging/discharging time, charging/discharging voltage, charging/discharging current, and the number of cycles. Finally, the number of cycles obtained from the charge/discharge device may be transmitted directly or indirectly to the control circuit 103 of the deformation analysis device 100 of the secondary battery. In some examples, if a CT image obtained from the CT imaging device 107 is transmitted to the control circuit 103, without the intervention of the charge/discharge device 108, the number of cycles may also be manually input through an input device.

[Generation of Intensity Graph]

Figure 4A:
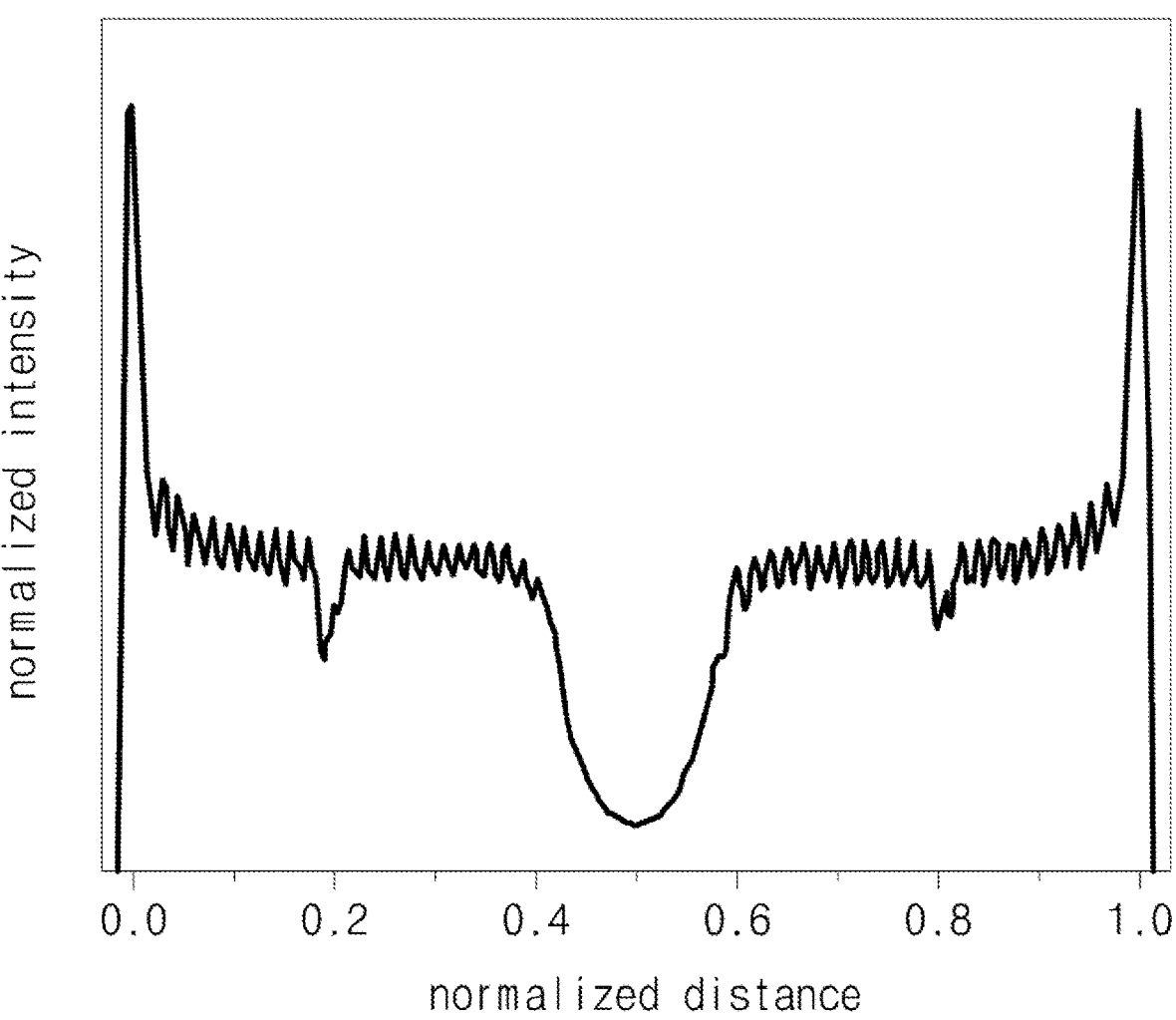
FIGS. 4A and 4B are intensity graphs obtained from CT images and intensity graphs for each cycle.
Figure 4B:
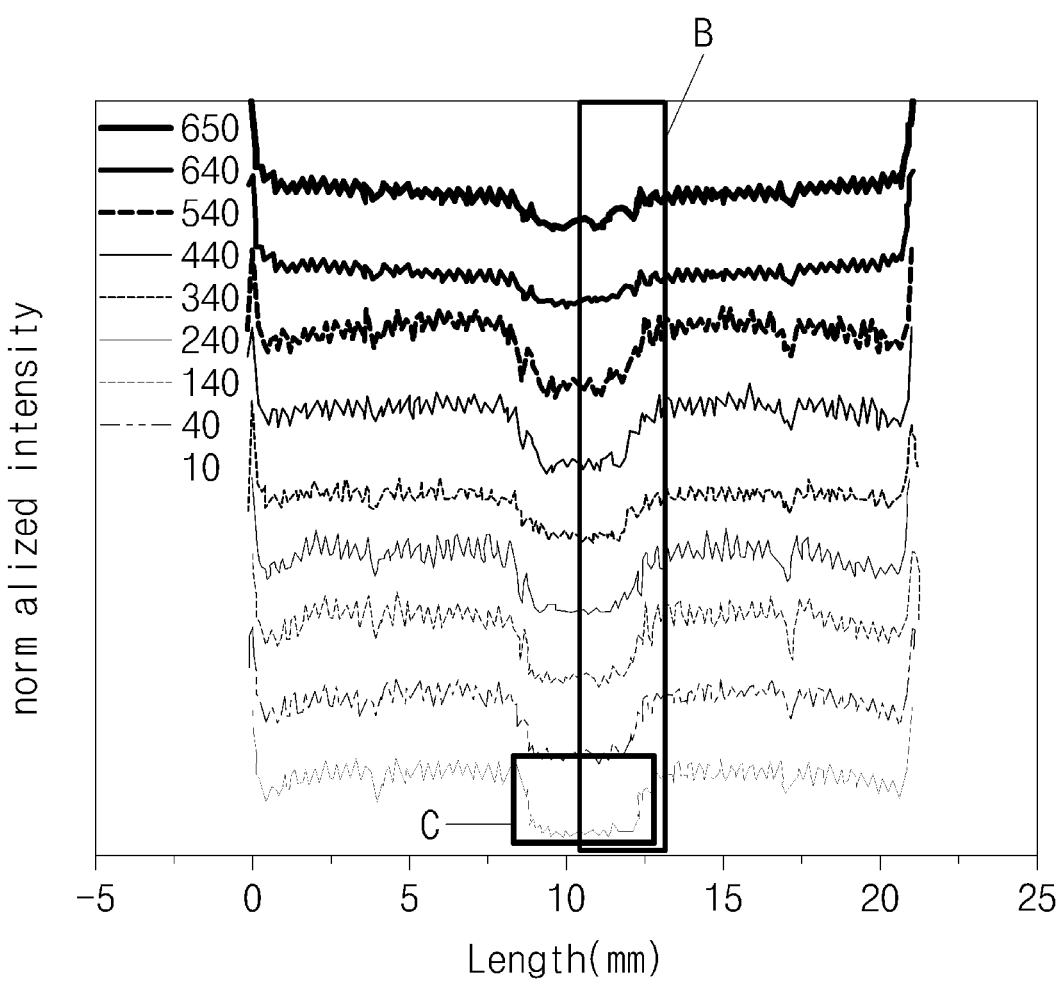

FIGS. 4A and 4B are intensity graphs obtained from CT images and intensity graphs for each cycle. In FIG. 4A, the X-axis is the normalized distance, and the Y-axis is the normalized intensity. In FIG. 4B, the X-axis is the length (mm), and the Y-axis is the normalized intensity. In addition, FIG. 4A shows one intensity graph, and FIG. 4B shows multiple intensity graphs according to the number of charge/discharge cycles. In some examples, the intensity graphs shown in FIGS. 4A and 4B may be obtained by processing the region "A" indicated by a box in the diagram of FIG. 3B (as described above, the shading of the actual CT image is opposite to the shading shown in FIG. 3B). In some examples, in the CT image, the core of the electrode assembly is dark in brightness, resulting in relatively low intensities in the corresponding portions of the intensity graphs. In some examples, in the electrode assembly, the periphery of the core, for example, the winding leading end region (30S) of the electrode assembly, is bright, and thus, the intensity is displayed to be relatively high in the corresponding part of the intensity graph.

[Measurement and Deformation Determination]

Figure 5A:
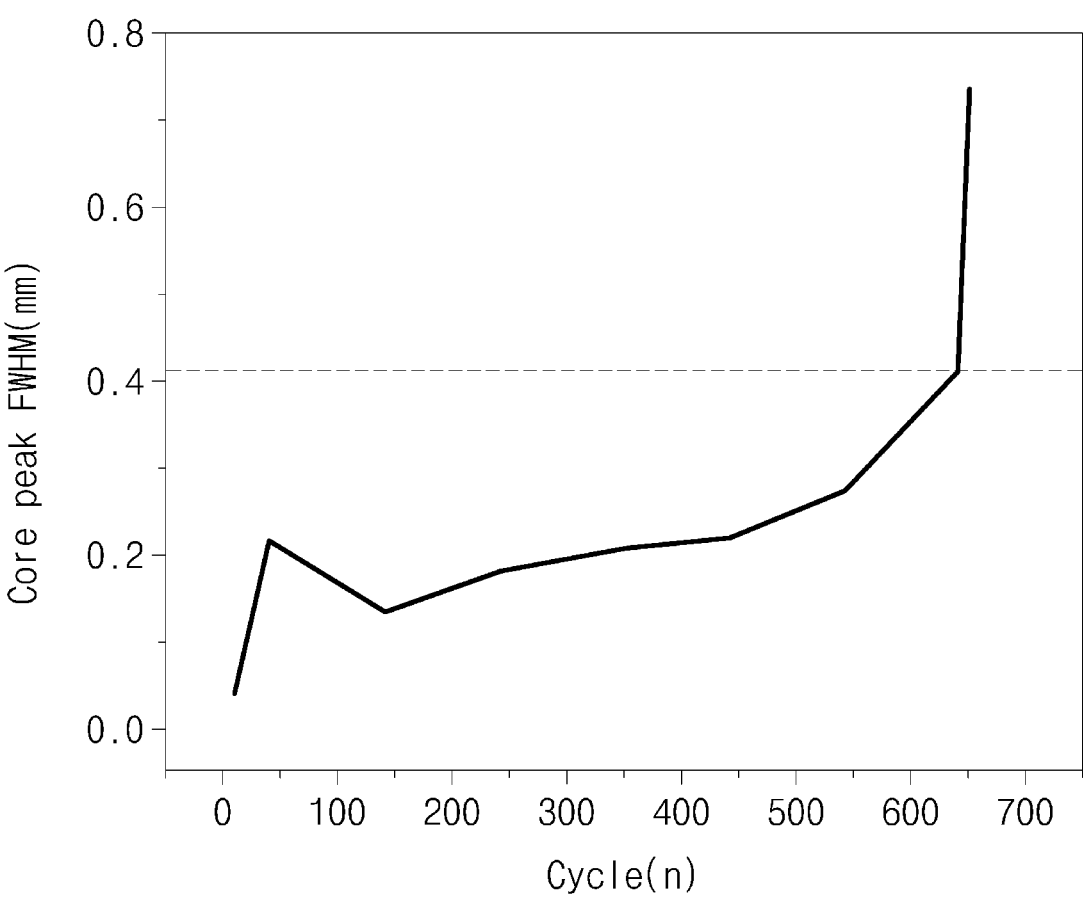
FIGS. 5A and 5B are a core peak FWHM (full width at half maximum) graph and a core diameter change graph obtained from the intensity graph.
Figure 5B:
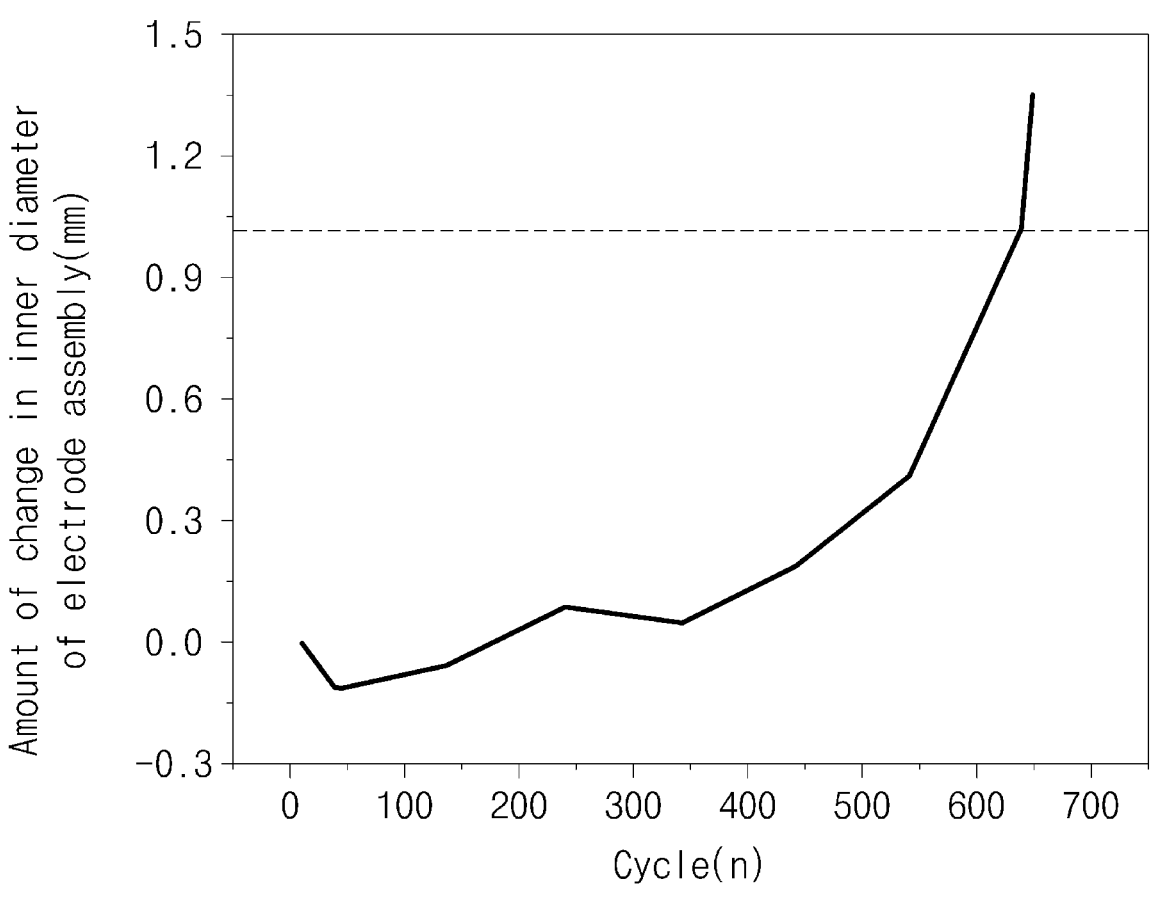

FIGS. 5A and 5B are a core peak FWHM (full width at half maximum) graph and a core diameter change graph obtained from the intensity graph. In FIG. 5A, the X-axis is the number of cycles, and the Y-axis is the core peak FWHM (mm). In FIG. 5B, the X-axis is the number of cycles, and the Y-axis is the change in core diameter (mm). In some examples, the region "B" indicated by a box in the intensity graph according to the number of charge and discharge cycles shown in FIG. 4B may be processed to measure the core peak FWHM, and the region "C" may be processed to measure the core diameter change value.

As shown in FIGS. 5A and 5B, the electrode assembly is deformed as the number of charge/discharge cycles of the secondary battery elapses, and thus, it can be seen that the core peak FWHM and/or the amount of change in core diameter increases. In some examples, the electrode assembly may be determined to be deformed if the core peak FWHM is greater than a preset peak reference value. In some examples, the peak reference value may be approximately 0.2 mm to approximately 0.6 mm. In FIG. 5A, the peak reference value is set to approximately 0.4 mm. In some examples, if the amount of change in core diameter is greater than a preset diameter reference value, the electrode assembly may be determined to have been deformed. In some examples, the diameter reference value may be approximately 0.5 mm to approximately 2 mm. In FIG. 5B, the diameter reference value may be set to approximately 1 mm. However, the reference value may vary depending on the electrochemical characteristics, size, or usage environment of the secondary battery.

In this way, in the deformation analysis device and method for a secondary battery according to an embodiment of the present disclosure, a plurality of CT images may be obtained according to the number of charge and discharge cycles of the secondary battery in a direction perpendicular to the winding axis of the electrode assembly. Thereafter, an intensity graph is generated according to the brightness difference or shade difference in the CT image, and then the core peak FWHM and/or core diameter change value is measured from the intensity graph to determine whether the electrode assembly is deformed. Therefore, according to the embodiments of the present disclosure, deformation of an electrode assembly provided in a secondary battery can be accurately identified by using a non-destructive analysis method without disassembling the secondary battery.

As described above, the present disclosure provides a deformation analysis device for a secondary battery and a method thereof, by which electrode deformation of a secondary battery can be diagnosed by using a computed tomography (CT) image that is a non-destructive analysis method.

While the foregoing embodiments are only one embodiment for carrying out the deformation analysis device for a secondary battery and the method thereof, according to the present disclosure, which are not limited to the embodiment, it will be understood by a person skilled in the art that various changes in form and details may be made therein without departing from the spirit and scope of the present disclosure as defined by the following claims.

Example embodiments have been disclosed herein, and although specific terms are employed, they are used and are to be interpreted in a generic and descriptive sense only and not for purpose of limitation.

What is claimed is:

1. A deformation analysis method for a secondary battery having an electrode assembly in a case, the deformation analysis method comprising steps of:
   obtaining an image by performing computed tomography (CT) imaging on the secondary battery;
   generating an intensity graph using brightness differences from the image;
   measuring a core peak FWHM (full width at half maximum) or a core diameter change value from the intensity graph; and
   determining that the electrode assembly is deformed if the measured core peak FWHM is greater than a peak reference value or the core diameter change value is greater than a diameter reference value.

2. The deformation analysis method as claimed in claim 1, wherein the secondary battery has a cylindrical shape.

3. The deformation analysis method as claimed in claim 1, wherein the electrode assembly includes a stack of a positive electrode plate, a separator, and a negative electrode plate wound into a cylindrical shape.

4. The deformation analysis method as claimed in claim 1, wherein the intensity graph is generated from a difference in brightness between the core and a core periphery of the electrode assembly.

5. The deformation analysis method as claimed in claim 4, wherein the core is an empty space, the periphery of the core is a winding leading end region of the electrode assembly, and the core is darker than the winding leading end region in brightness.

6. The deformation analysis method as claimed in claim 1, wherein the image is obtained by photographing perpendicular to a winding axis of the electrode assembly.

7. The deformation analysis method as claimed in claim 1, wherein the steps are repeatedly performed depending on a number of charge/discharge cycles of the secondary battery.

8. The deformation analysis method as claimed in claim 7, further comprising a step of converting a change in the core peak FWHM according to the number of charge/discharge cycles into a peak FWHM graph or converting a change in the core diameter according to the number of charge/discharge cycles into a diameter change graph.

9. The deformation analysis method as claimed in claim 1, wherein the peak reference value is 0.2 mm to 0.6 mm.

10. The deformation analysis method as claimed in claim 1, wherein the diameter reference value is 0.5 mm to 2 mm.

11. A deformation analysis device for a secondary battery having an electrode assembly in a case, the deformation analysis device comprising:
   a control circuit;
   a processor installed in the control circuit; and
   a memory installed in the control circuit and operably connected to the processor,
   wherein the processor executes a program code stored in the memory configured to perform operations of:
   obtaining an image by performing CT (computed tomography) scanning of the secondary battery;
   generating an intensity graph using brightness differences from the image;
   measuring a core peak FWHM (full width at half maximum) or a core diameter change value from the intensity graph; and
   determining that the electrode assembly is deformed if the measured core peak FWHM is greater than a peak reference value or the core diameter change value is greater than a diameter reference value.

12. The deformation analysis device as claimed in claim 11, wherein the secondary battery has a cylindrical shape.

13. The deformation analysis device as claimed in claim 11, wherein the electrode assembly includes a stack of a positive electrode plate, a separator, and a negative electrode plate wound into a cylindrical shape.

14. The deformation analysis device as claimed in claim 11, wherein the intensity graph is generated from a difference in brightness between the core and a core periphery of the electrode assembly.

15. The deformation analysis device as claimed in claim 14, wherein the core is an empty space, the periphery of the core is a winding leading end region of the electrode assembly, and the core is darker than the winding leading end region in brightness.

16. The deformation analysis device as claimed in claim 11, wherein the image is obtained by photographing perpendicular to a winding axis of the electrode assembly.

17. The deformation analysis device as claimed in claim 11, wherein the operations are repeatedly performed depending on a number of charge/discharge cycles of the secondary battery.

18. The deformation analysis device as claimed in claim 17, wherein the processor is further configured to further perform an operation of converting a change in the core peak FWHM according to the number of charge/discharge cycles into a peak FWHM graph or converting a change in the core diameter according to the number of charge/discharge cycles into a diameter change graph.

19. The deformation analysis device as claimed in claim 11, wherein the peak reference value is 0.2 mm to 0.6 mm.

20. The deformation analysis device as claimed in claim 11, wherein the diameter reference value is 0.5 mm to 2 mm.

\* \* \* \* \*